May 17, 1966  H. W. BOTELER  3,251,122
METHOD OF MAKING A DIAPHRAGM VALVE
Filed July 19, 1962  12 Sheets-Sheet 1
FIG. 1
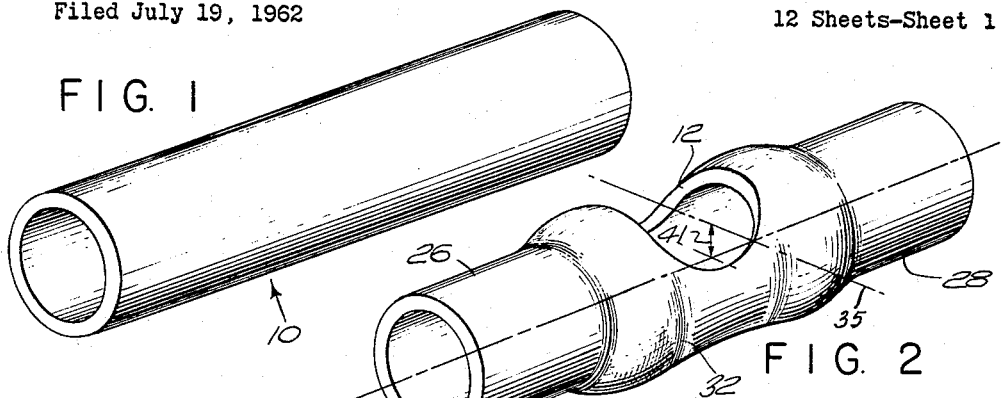
FIG. 2
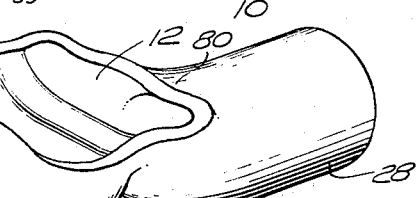
FIG. 3
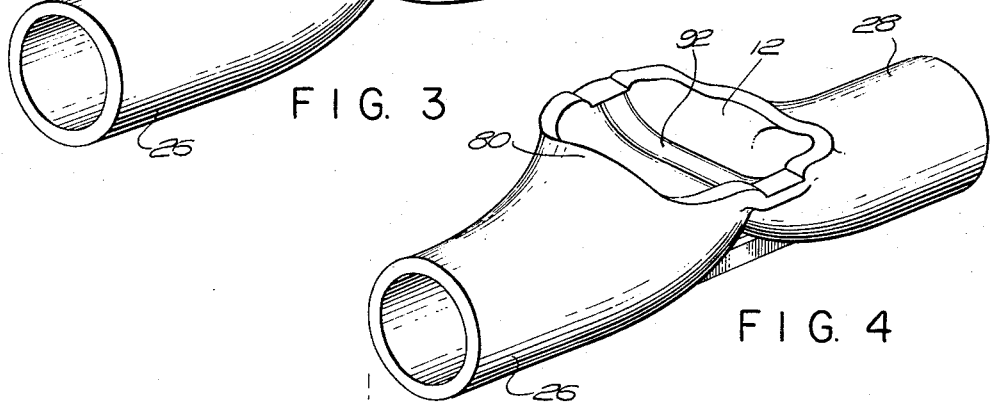
FIG. 4
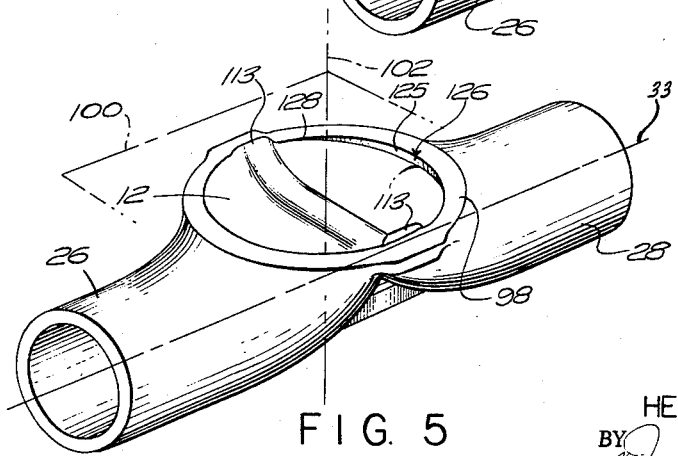
FIG. 5
INVENTOR.
HENRY W. BOTELER
BY
ATTORNEY May 17, 1966 H. W. BOTELER 3,251,122
METHOD OF MAKING A DIAPHRAGM VALVE
Filed July 19, 1962 12 Sheets-Sheet 5

*INVENTOR.*
HENRY W. BOTELER
*BY* David D. McKenney
ATTORNEY

May 17, 1966   H. W. BOTELER   3,251,122
METHOD OF MAKING A DIAPHRAGM VALVE
Filed July 19, 1962   12 Sheets-Sheet 4

INVENTOR.
HENRY W. BOTELER
BY
ATTORNEY

May 17, 1966 H. W. BOTELER 3,251,122
METHOD OF MAKING A DIAPHRAGM VALVE
Filed July 19, 1962 12 Sheets-Sheet 6

INVENTOR.
HENRY W. BOTELER
BY
ATTORNEY

May 17, 1966  H. W. BOTELER  3,251,122
METHOD OF MAKING A DIAPHRAGM VALVE
Filed July 19, 1962  12 Sheets-Sheet 7

INVENTOR.
HENRY W. BOTELER
BY
ATTORNEY

May 17, 1966 H. W. BOTELER 3,251,122
METHOD OF MAKING A DIAPHRAGM VALVE
Filed July 19, 1962 12 Sheets-Sheet 9

INVENTOR.
HENRY W. BOTELER
BY
ATTORNEY

May 17, 1966
H. W. BOTELER
3,251,122
METHOD OF MAKING A DIAPHRAGM VALVE
Filed July 19, 1962
12 Sheets-Sheet 10
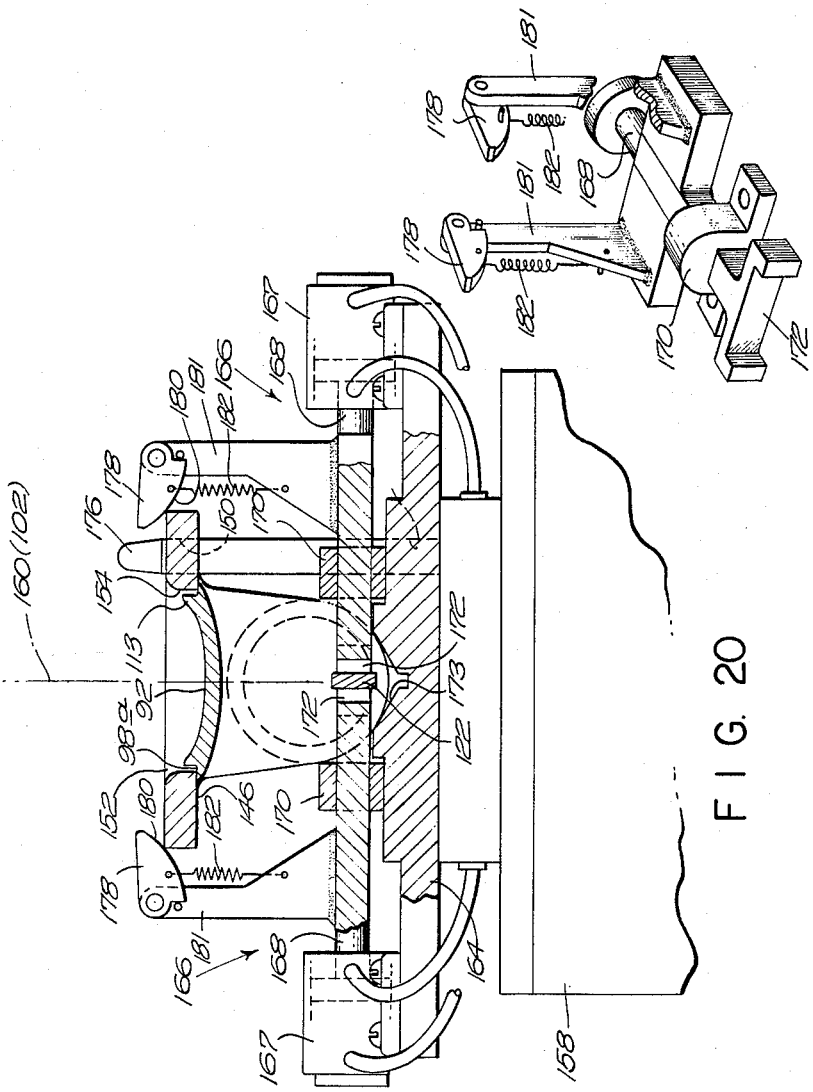
INVENTOR.
HENRY W. BOTELER
BY
ATTORNEY May 17, 1966   H. W. BOTELER   3,251,122
METHOD OF MAKING A DIAPHRAGM VALVE
Filed July 19, 1962   12 Sheets-Sheet 11

INVENTOR.
HENRY W. BOTELER
BY
ATTORNEY

May 17, 1966 H. W. BOTELER 3,251,122
METHOD OF MAKING A DIAPHRAGM VALVE
Filed July 19, 1962 12 Sheets-Sheet 12
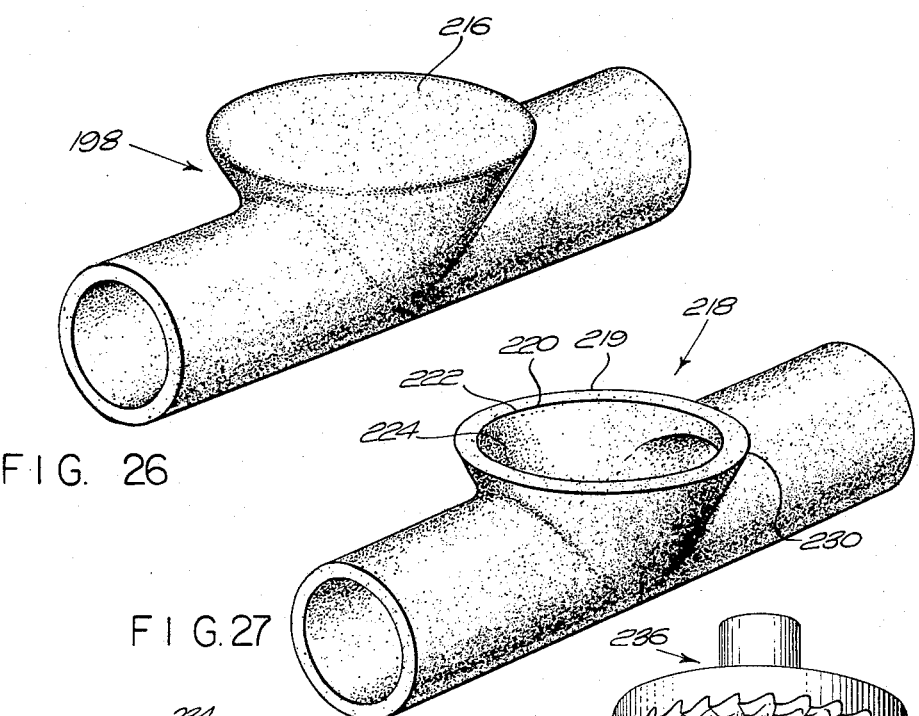
FIG. 26
FIG. 27
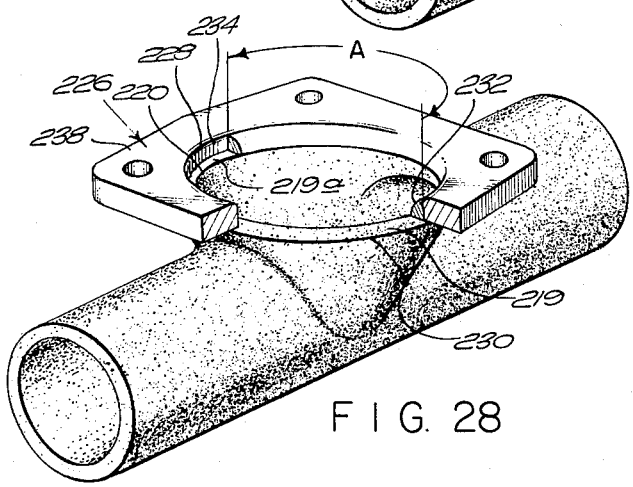
FIG. 28
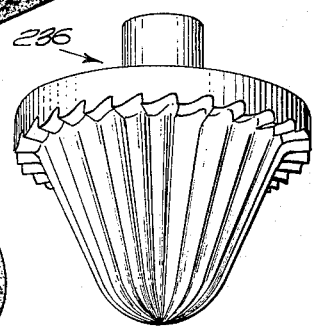
FIG. 29
INVENTOR.
HENRY W. BOTELER
BY
ATTORNEY

United States Patent Office 3,251,122
Patented May 17, 1966

3,251,122
METHOD OF MAKING A DIAPHRAGM VALVE
Henry W. Boteler, East Greenwich, R.I., assignor to Grinnell Corporation, Providence, R.I., a corporation of Delaware
Filed July 19, 1962, Ser. No. 210,984
8 Claims. (Cl. 29—157.1)

This invention relates to improvements in method of making diaphragm valve bodies. More particularly, it has to do with a novel method of forming diaphragm valve bodies from pieces of pipe and plate.

There are a number of different types of diaphragm valves in use today, and probably the most common of these is the one in which the body has a flow passage or bore intercepted by a high transverse weir arising from one side of the passage toward a diaphragm opening on the opposite side. This opening is provided with a surrounding flange which extends outwardly from the axis of the opening, the surface of which is in a plane parallel to the axis of the passage and against which the periphery of a diaphragm is adapted to be clamped by the end of a bonnet housing the actuating mechanism. The ends of the weir blend smoothly with this flange, and the center portion of the weir is concaved so that when the center of the diaphragm (which is dome-shaped and covers the diaphragm opening) is bulged toward the weir by the actuating mechanism, it engages the weir surface and seals off the flow across the weir from one end of the passage to the other. Conversely, when the center of the diaphragm is bulged away from the weir by the actuating mechanism it permits flow between the weir and the diaphragm from one end of the passage to the other.

Another very popular type of diaphgram is the one in which the weir has been eliminated or substantially eliminated so that passage is uninterrupted. This feature necessitates the use of a diaphragm with a center portion which is much more deeply bulged than the weir-type so that it can reach completely across the passage to engage the seating and close the valve. Except for these modifications, however, the construction is substantially like that of the weir-type diaphragm valve.

Almost without exception the metal diaphragm valve bodies which have been sold in the past have been cast in sand, for example, from molten grey iron, bronze or steel. However, such cast metal valve bodies have a number of serious disadvantages. First of all, metals cast in sand tend to be porous sometimes to the extent that cavities and the like appear on the interior surfaces of the flow passageway, and these cavities later have to be filled in by hand welding and then hand ground to provide a smooth surface. Similarly, even when such surfaces appear to be smooth and free of cavities, nevertheless they may be sufficiently porous to be unsatisfactory for receiving the glass linings which frequently must be applied to the passages of metal diaphragm valve bodies. And, further, cast metal valve bodies are relatively thick walled and heavy in order to facilitate pouring, to withstand the fluid pressures and to withstand the distortion caused by clamping of the diaphragm periphery.

The present invention overcomes these difficulties by providing a method of forming diaphragm valve body, which is of substantially the same shape as the cast metal bodies, from rolled or forged or machined metal shapes having particular configurations by having these shapes secured together in a particular way.

In one embodiment of the invention a diaphragm valve body is formed from a piece of relatively heavy walled pipe and a piece of relatively thick plate. The piece of pipe is machined in a particular way and then pressure formed until it has the shape of the passage and the diaphragm seating. The piece of plate is machined into the shape of a conventional diaphragm opening flange. These two sections are then welded together between the interior edge of the diaphragm opening in the flange plate and an exposed portion of a flat surface provided around the diaphragm opening in the pipe section. In one manner of practicing the method of the present invention to make a weir-type diaphragm valve body the initially unformed pipe section is first heated to a high temperature and has its center portion bulged radially outwardly on all sides by compressing the section along its axis. Next, the section is permitted to cool and an opening of particular shape is cut in one side of its bulged center portion. Then the section is reheated, and has the weir pressed inwardly from the side opposite the opening. This formation of the weir alters the shape of the opening and generally increases its size, and this altered opening shape is next modified by machining the opening edge after the section has cooled. Finally, a flange plate section is welded to the surface provided around the opening by the machining referred to.

Accordingly, it is one object of the present invention to provide an improved method of forming a metal diaphragm valve body from (1) a section of metal pipe which has been formed into the shape of the passage seating and (2) a plate section which has been formed into the shape of the conventional large diaphragm flange, the two sections being welded together at a shelf formed by a flat surface around the pipe section opening which extends slightly inwardly with respect to the inner edge of a corresponding opening in the flange.

Another object is to provide a method of making a metal diaphragm valve body by (1) forming in one side of a pipe section an opening which is of particular shape and has an edge in the form of a flat annular flange shelf (2) forming a seating on the side of said section opposite said opening (3) forming an opening in a flat flange plate section and (4) welding the pipe and plate sections together between the pipe section flange shelf and the wall of the plate section opening.

Another object is to provide a method of forming a diaphragm valve body which is inexpensive and reliable and which results in a satisfactory product.

Other objects will appear hereinafter.

In the drawings:

FIGURES 1 to 5 are perspective views showing a pipe section in various stages during its formation, according to one practicing of the present method invention;

FIGURE 20 is a partially sectioned end elevation view taken on line 20—20 of FIG. 19;

FIGURE 21 is a perspective view of a part of the holding fixture shown in FIGS. 19 and 20;

FIGURE 26 is a perspective view of the pipe section resulting from FIG. 25;

FIGURE 27 is a view like FIG. 26 showing the pipe section after a machining operation;

FIGURE 28 is a view like FIG. 27 but partly sectioned to show how a plate is welded to the pipe section to complete the weir-less valve body; and FIGURE 29 is a perspective view of a milling cutter which may be used to dress the weld and the entire diaphragm seating as well.

Figure 6:
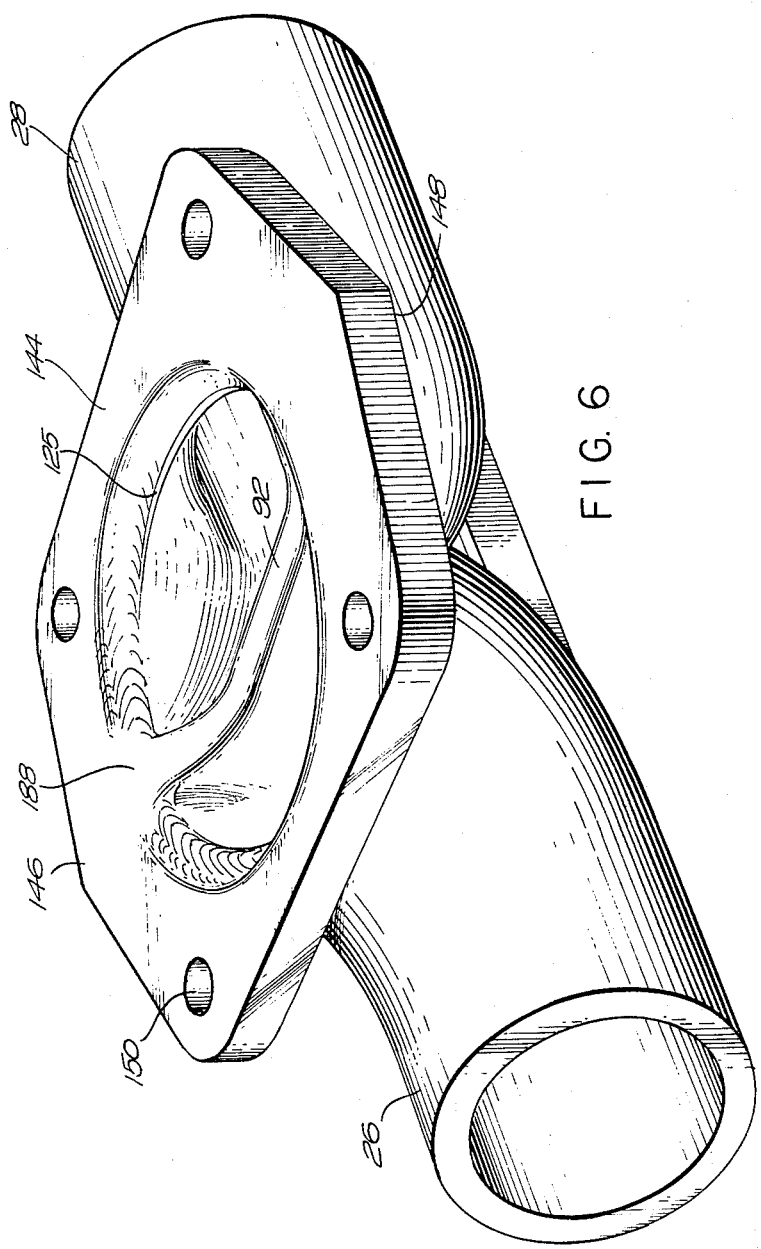
FIGURE 6 shows a completed diaphragm valve body.

Referring now more particularly to the drawings, FIGS. 1–5, 16, 18 and 22 show the various forms of a pipe section and a plate section during their preparation according to one embodiment of the present method invention. FIG. 6 shows a finished diaphragm valve body made according to the method invention. FIG. 1 shows a pipe section 10, for example, a piece of two inch (inside diameter) Schedule 80 carbon steel pipe about 10.25 inches long, as the starting form.

Figure 7:
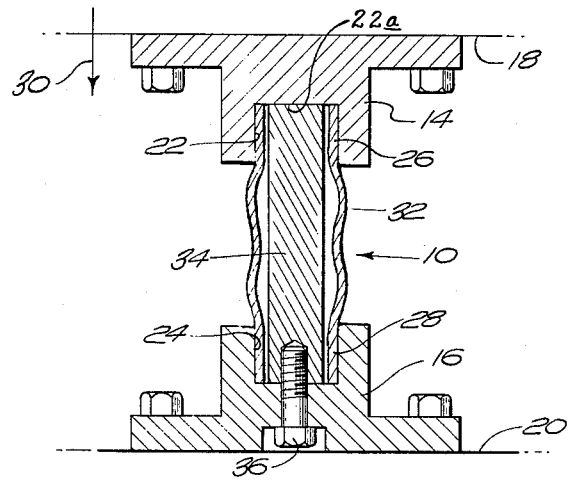
FIGURE 7 is a cross-sectioned side elevation showing the equipment with which the pipe section is bulged as shown in FIG. 2.

FIG. 2 shows the shape of section 10 after it has been heated to a temperature of approximately 1200° F., compressed with equipment shown in FIG. 7 and then machined to make an opening 12. This compressing equipment includes opposed die halves 14 and 16 which are secured to press parts 18 and 20, respectively, and which have socket portions 22 and 24 for receiving the ends 26 and 28 of the pipe section 10. Closing the press (for example, by movement of upper part 18 in the direction of the arrow 30 while holding the lower part 20 stationary) bulges the section's central part 32 radially outwardly on all sides to the shape shown in FIGS. 2 and 7. A central axial core piece 34 secured to the lower die half 16 by bolt 36 acts as a stop to limit the closure of the press parts by engaging the end wall 22a of socket 22.

The opening 12 is machined substantially in the middle of the bulged central pipe section part 32 by a rotary machine tool cutting into one side of the section on a radius of about one inch about an axis 35 which is at right angles to the pipe section axis 33 and which is spaced a distance 41 (about 1⅜ inches) therefrom.

Figure 8:
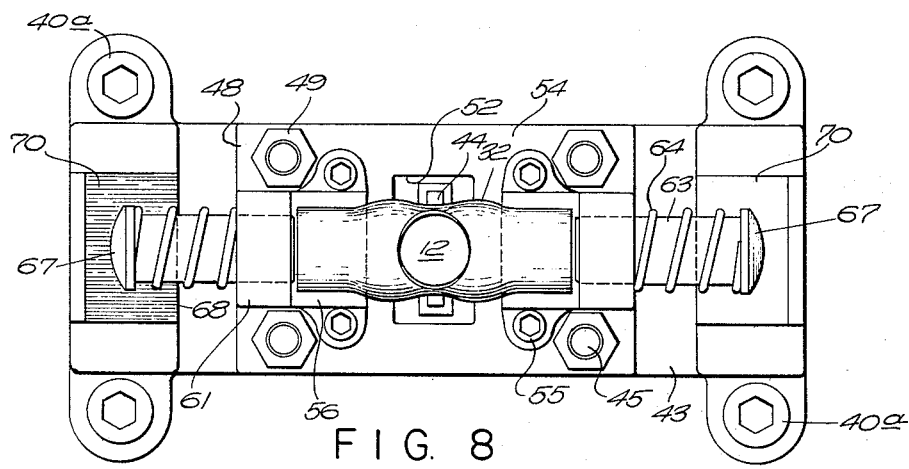
FIGURE 8 is a plan view taken on line 8—8 of FIG. 9, showing the FIG. 2 form of the pipe section located in the forming dies which produce the FIG. 3 form.
Figure 9:
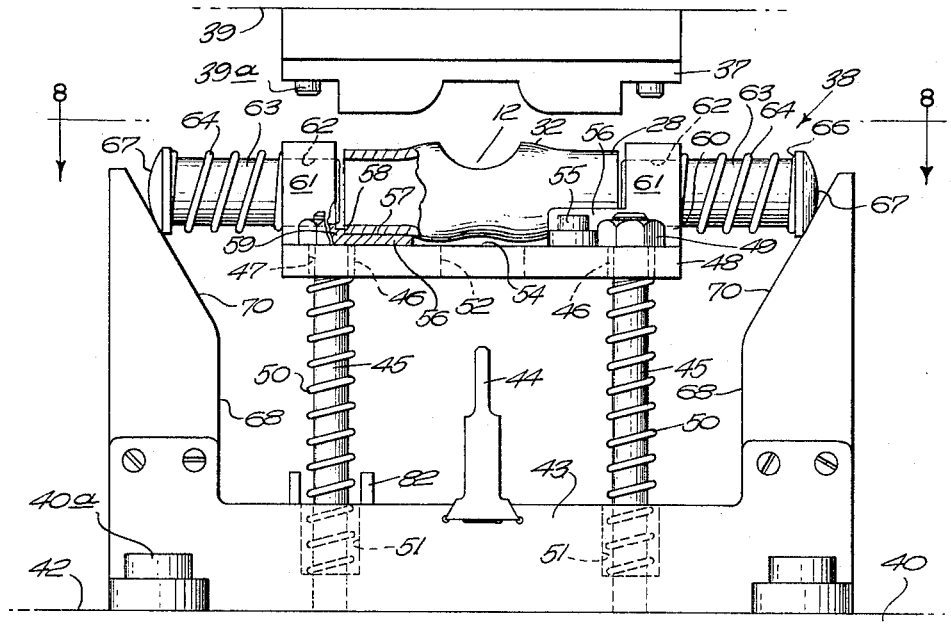
FIGURE 9 is a side elevation view of the forming dies of FIG. 8, with the dies in open position.
Figure 10:
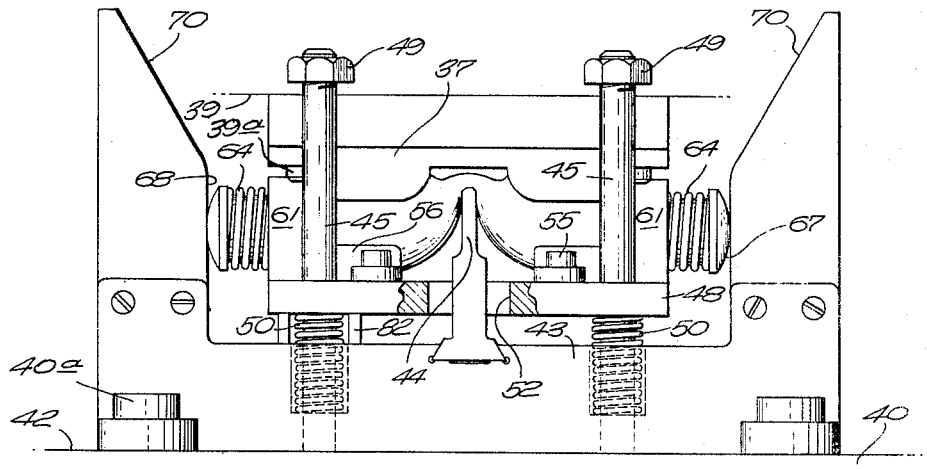
FIGURE 10 shows the forming dies of FIG. 9 in closed position.

FIG. 3 shows the shape of section 10 after it has been reheated to the same temperature as before (approximately 1200° F.) and after it has been further formed on equipment like that shown in FIGS. 8, 9 and 10.

This equipment includes opposed forming dies 37 and 38 mounted between two parts 39 and 40 of a second press and secured thereto by bolts 39a and 40a. As in FIG. 7, the lower press part 40 is preferably stationary and the upper press part 39 is movable vertically toward and away from the lower press part, although it will be understood that the lower press part can be movable and the upper press part stationary, or both press parts can be movable if desired. Secured to the horizontal, upwardly-presented surface 42 of the lower press part is a die base 43 which has a vertical weir shaping plate 44 extending upward from its center and which has mounted therearound the lower ends of four vertical guide pins 45. The extending portions of these guide pins are slidably received in guide bushings 46 secured in vertically aligned openings 47 through a horizontally disposed and vertically movable platform 48. The upper ends of these guide pins 45 extend through the platform 48 and bushings 46 and are provided with retaining nuts 49. This platform is normally spaced above the die base 43 by compression springs 50 which surround the guide pins and have their lower ends received in recesses 51 in the base 43. A large opening 52 is provided through the center of the movable platform 48 to accommodate the weir shaping plate 44 so that the platform passes freely down around this plate when it is moved toward the die base 43 in the manner which will be described.

Secured to the upper platform surface 54 by bolts 55 on opposite sides of the opening 52 are a pair of aligned work-holding cradles 56 which are adapted to receive the ends 26 and 28 of the pipe section 10 of FIG. 2. More particularly, these cradles have curved recesses 57 with shallow end walls or lips 58 at their opposite ends 59 and 60. These lips extend radially inwardly less than the thickness of the pipe section wall so that they do not cover the end openings in the pipe sections but do serve to locate the pipe section on the platform 48 so that its bulged central portion 32 is directly above the weir shaping plate 44.

Beyond the end of each cradle 56 and in line therewith is an upstanding bracket 61 which can be integral with the cradle and which has a journal opening 62 horizontally and slidably guiding the movable plunger 63. When this plunger is pushed inwardly with respect to the platform in a manner which will be described it enters one end opening of a pipe section resting on the cradles. The purpose of these plungers is to cooperate with the cradles 56 in maintaining the ends of the pipe section substantially undistorted while their weir is being formed and particularly to retain the alignment of the pipe section ends during such forming.

Springs 64 surround the portions of the plungers which extend outwardly from brackets 61 and are confined between these brackets and plunger shoulders 66. As a result the springs urge the plungers away from the work. However, the plunger ends have surfaces 67 which engage cams 70 secured to the die base 43, and these cams are shaped in such a way that when the platform 48 is moved downwardly against the force of the springs 50 the plungers 63 are pushed inwardly against the force springs 64 and into the ends 26 and 28 of the pipe section 10. Preferably, the cams 70 are arranged so that all of this inward plunger motion is completed before the weir forming plate 44 engages the underside of the pipe section 10. Thereafter the plunger end surfaces 67 merely ride along vertical cam surfaces 68, maintaining the plungers in the pipe section while the weir is being formed.

Figure 11:
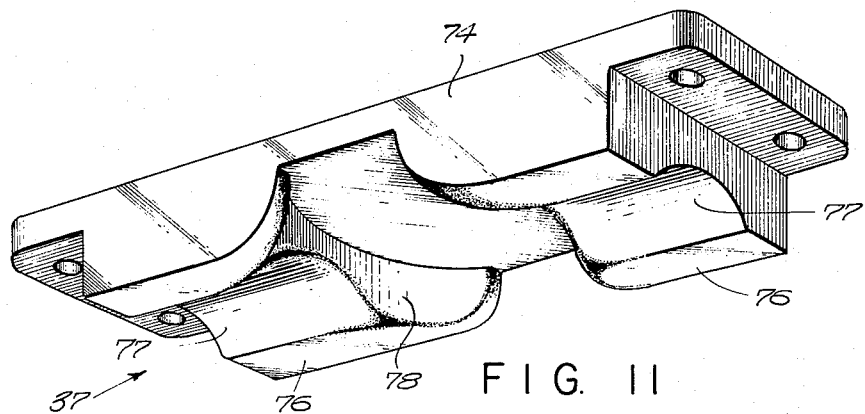
FIGURE 11 is a perspective view of the die part in the upper half of the dies of FIGS. 8, 9 and 10.

The upper die 37 is preferably formed from one block of metal 74 and provides a pair of aligned upper cradles 76 best shown in FIG. 11. More particularly, these cradles comprise a pair of aligned curved recesses 77 which are directly above the corresponding recesses 57 of the lower cradles 56. Accordingly, when the upper press part 39 is moved downwardly the ends of the pipe section are embraced and firmly gripped by the upper and lower cradle recesses.

At the inner ends 78 of upper cradle recesses the block 74 is formed to confine and shape portions 80 of the pipe section which are pressed against it when the weir is formed, see FIG. 3. These portions are primarily those which surround the pipe section opening 12. The objective is to so form these portions 80 that subsequent machining (which will presently described) will enlarge this opening 12 and provide a flange therearound which has a particular shape.

Operation of the equipment of FIGS. 8, 9 and 10 is as follows: a heated pipe section 10 like that shown in FIG. 2 is placed in the cradles 56 with the opening 12 uppermost. The upper press part 39 is in the position shown in FIG. 9 which provides ample room between the dies 37 and 38 for loading the heated pipe section onto the cradles 56. When the upper press part 39 is then moved downwardly, the recesses 77 of cradles 76 are first brought into contact with the pipe section ends 26 and 28 and firmly clamp these ends against the recesses 57 of the lower cradles 56. Continued downward motion of the upper press part 39 then results in downward movement of the platform 48, whereupon cams 70 push the plungers 63 inwardly into the pipe section openings in the manner above described, and continued downward movement drives the bulged center portion of the pipe section down upon the stationary weir forming plate 44. This forces this portion upwardly until stops 82 on the die base 43 engage the platform 48 and prevent further closing of the press. At this point, the pipe section has been formed into the shape shown in FIG. 3.

Figure 12:
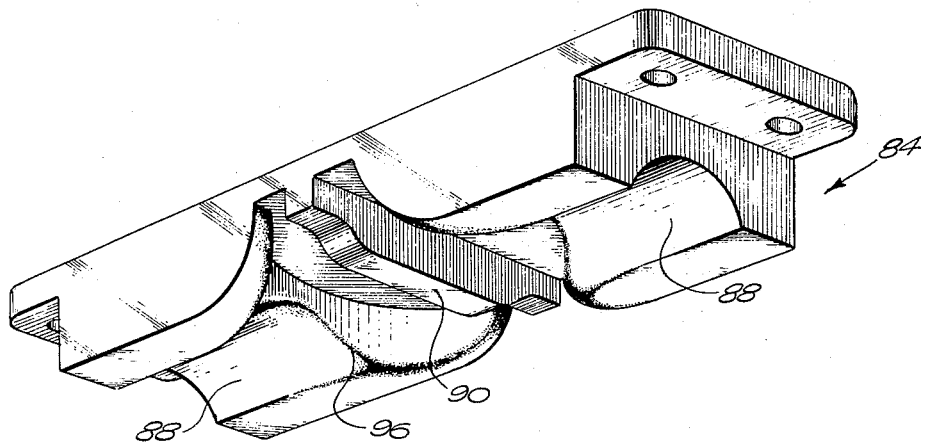
FIGURE 12 is a perspective view of the die part in the upper half of the forming dies of FIGS. 13 and 14.
Figure 13:
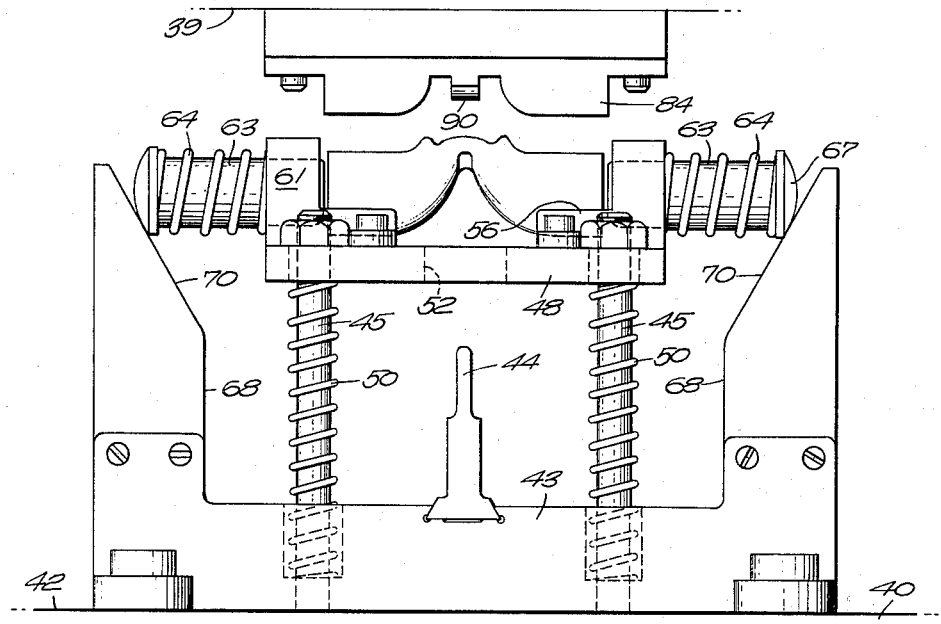
FIGURES 13 and 14 are views corresponding to FIGS. 9 and 10 but showing another set of forming dies which provides the pipe section shape shown in FIG. 4.
Figure 14:
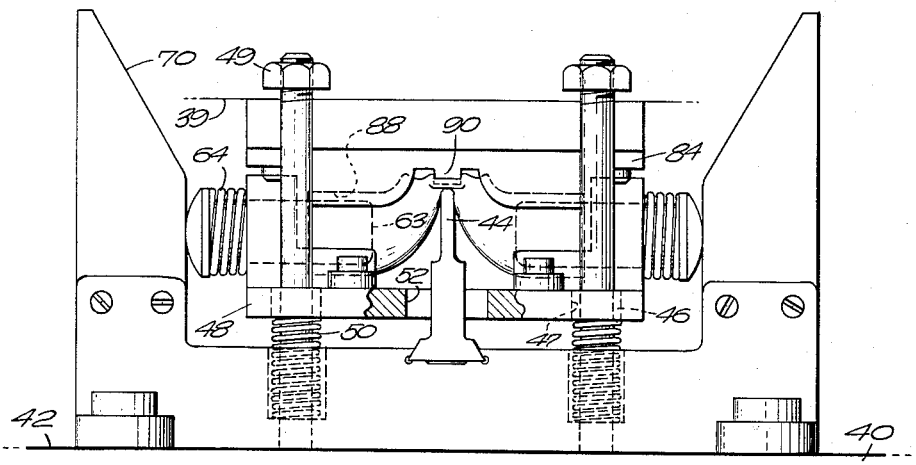

The FIG. 3 pipe section is then removed from the lower die cradles 56 and reheated to approximately the same temperature of 1200° F. after which it is "coined" in another set of dies shown in FIGS. 12, 13 and 14. This other set of dies is substantially the same as the set shown in FIGS. 8, 9 and 10 and 11 except that the upper die 84 has, in addition to cradle recesses 88, a weir forming bar 90, see FIG. 12. The lower die may be identical to the one shown in FIGS. 9 and 10 and like numbers indicate like parts.

The forming bar 90 in the upper die 84 is employed to give the center of the upper weir surface 92 the proper final shape, see FIG. 4. It is not possible to thus engage this weir surface until the opening 12 has been enlarged by the tooling of FIGS. 8, 9, 10 and 11. However, once this opening is enlarged as shown in FIG. 3 the weir surface 92 can be engaged, and at the same time the die parts 96 which engage the pipe section portions 80 around the opening 12 are given a shape that will finally prepare the opening 12. FIG. 4 shows the shape of the pipe section after it has been formed with the tooling shown in FIGS. 12, 13, and 14.

Figure 15:
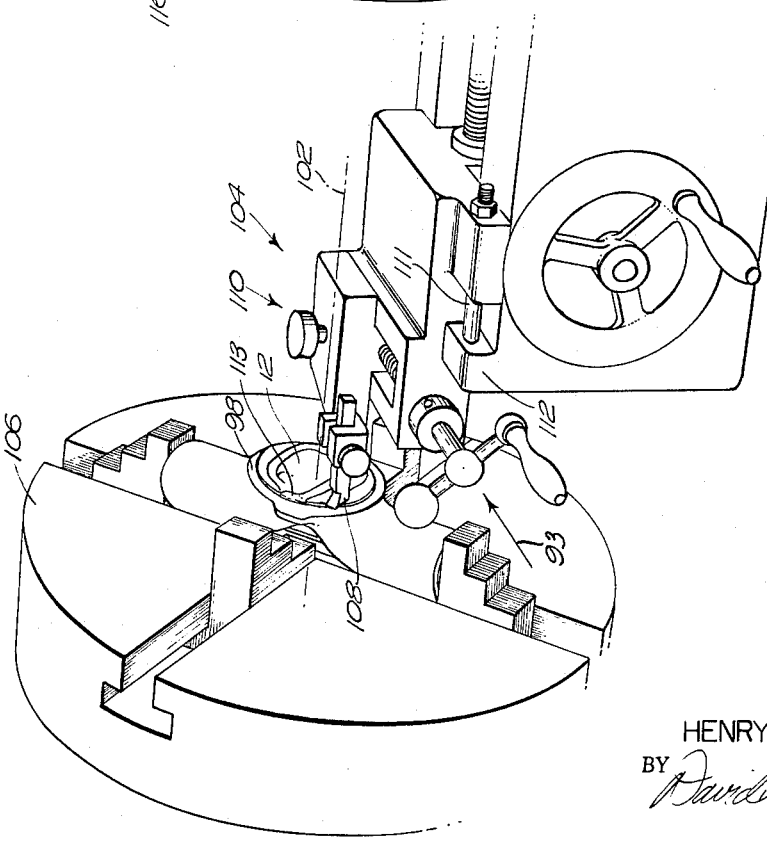
FIGURE 15 is a perspective view showing the FIG. 4 shape being machined in a lathe in accordance with one practicing of the method invention.
Figure 16:
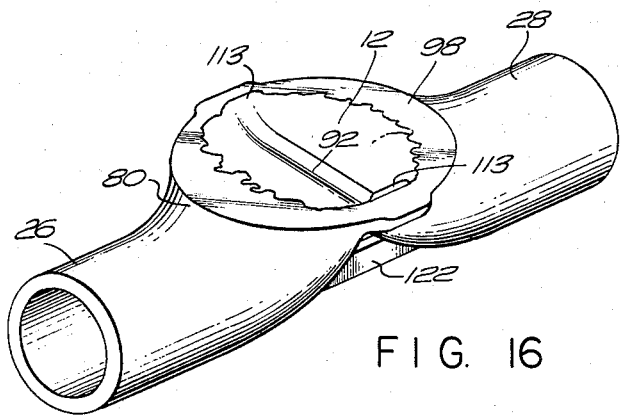
FIGURE 16 is a perspective view showing the shape of the pipe section after it has been machined in the manner indicated in FIG. 15.

Next, this FIG. 4 pipe section is machined to enlarge the opening 12 and to form a flange 98 therearound which is in a plane 100 parallel to the section axis 40 and perpendicular to the opening axis 102. This flange 98 can be achieved by any one of a number of machine operations which will occur to those skilled in this art. For example, the FIG. 4 pipe section could be milled. However, I prefer to use a lathe 104 as illustrated in FIG. 15 in which the pipe section is mounted on a chuck 106 for rotation about the axis 102 of the opening 12. The cutting tool 108 is mounted on the usual tool holder 110 which is movable toward the work in the direction of the axis 102 and which has an adjustable stop 111 arranged to engage a bracket 112. This tool holder is also movable in a direction 93 perpendicular to the axis 102 and, as to this motion, is initially set so that the cutting tool is spaced a sufficient distance from axis 102 to be out of engagement with the work. Then the tool holder is moved in direction 92 to carry the tool 108 into the work toward the axis 102. This inward movement of the tool 108 is continued until the flange 98 which is cut has a substantial width. It is not necessary or desirable to completely cut off the weir ends 113 which extends beyond the level of this flange. The flange surface 98 is wide enough for the welding (which will be described subsequently) if it cuts away only enough of these weir ends to permit penetration of the weld material, and in addition, by leaving as much of the projecting weir ends as possible, less added weld material is needed to make the weir surface blend smoothly with the diaphragm clamping flange. FIG. 16 shows how the pipe section appears after the operation illustrated in FIG. 15.

Figure 17:
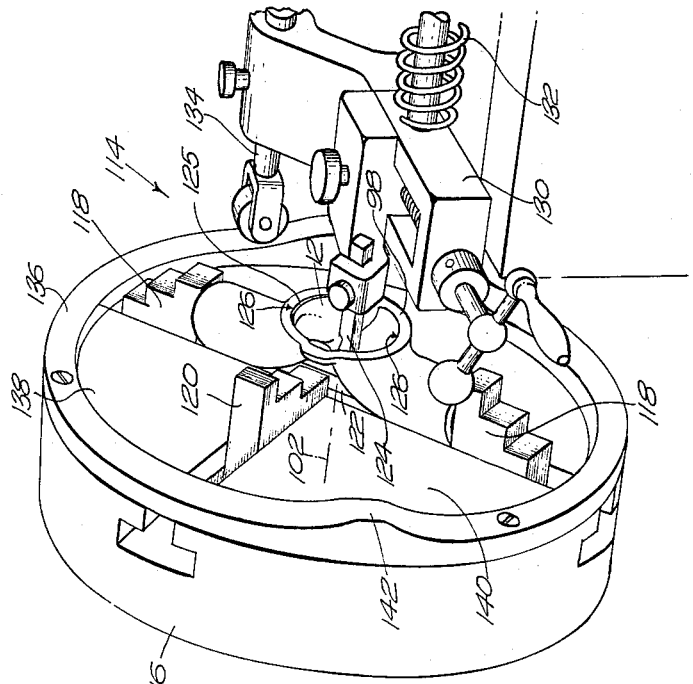
FIGURE 17 is a perspective view showing the FIG. 16 pipe section shape being further machined in another lathe in accordance with one practicing of the method invention.

FIG. 17 shows, also somewhat diagrammatically, how the inside diameter of the pipe section opening 12 is cut after the flange surface 98 is completed. Again a lathe 114 is used with the work secured in the chuck 116 in the usual manner. For example, one pair of opposed jaws 118 engage the ends of the section, and the other pair 120 engage opposite sides of a reinforcing web 122 welded to the back side of the section. This locates the work so that the axis 102 of the diaphragm opening 12 coincides with the axis of rotation of the chuck 116.

The cutting tool 124 in FIG. 17 advances into the opening 12 beyond the plane of flange 98 and forms the cylindrical inside wall 125 substantially parallel to the axis 102. The amount of advance of the tool 124 into the opening is determined by the thickness of the material which extends inwardly from the edges of the opening after the flange surface 98 has been cut. This thickness is usually maximum at the opposed points 126 most remote from the weir ends, and approaching the weir ends from these points 126 this thickness diminishes and actually disappears at points 128 adjacent the sides of the weir ends, see FIG. 5.

To prevent the cutting tool 124 from cutting into these weir ends as the work rotates the tool carriage 130, urged toward the chuck 116 by a spring 132, is held at the proper depth for the cutting above described by a cam follower 134 secured to the carriage 130 and rolling on a cam surface 136, mounted on the peripheral portion 138 of the chuck face 140.

High points 142 on the cam surface and registered with pipe section cause the tool 124 to be wtihdrawn from the opening 12 and to clear each of the weir ends and to be advanced into the work on the other side of such weir end.

FIG. 5 shows how the pipe section appears after the operation illustrated in FIG. 16.

Figure 18:
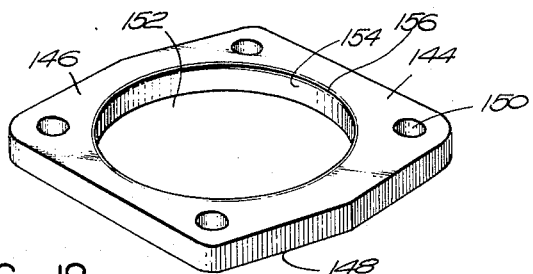
FIGURE 18 is a perspective view of a plate section which when joined to the pipe section completes the valve body.

The next step in this embodiment of the present invention is the welding together of the pipe section of FIG. 5 and a diaphragm clamping plate 144 such as the one illustrated in FIG. 18. This plate has a pair of substantially flat and parallel opposite surfaces 146 and 148 and a peripheral shape which is more or less rectangular. Bolt holes 150 are located in the corners and there is a large central circular diaphragm opening 152 which has substantially cylindrical side walls 154 bevelled at their junction 156 with surface 146.

Figure 19:
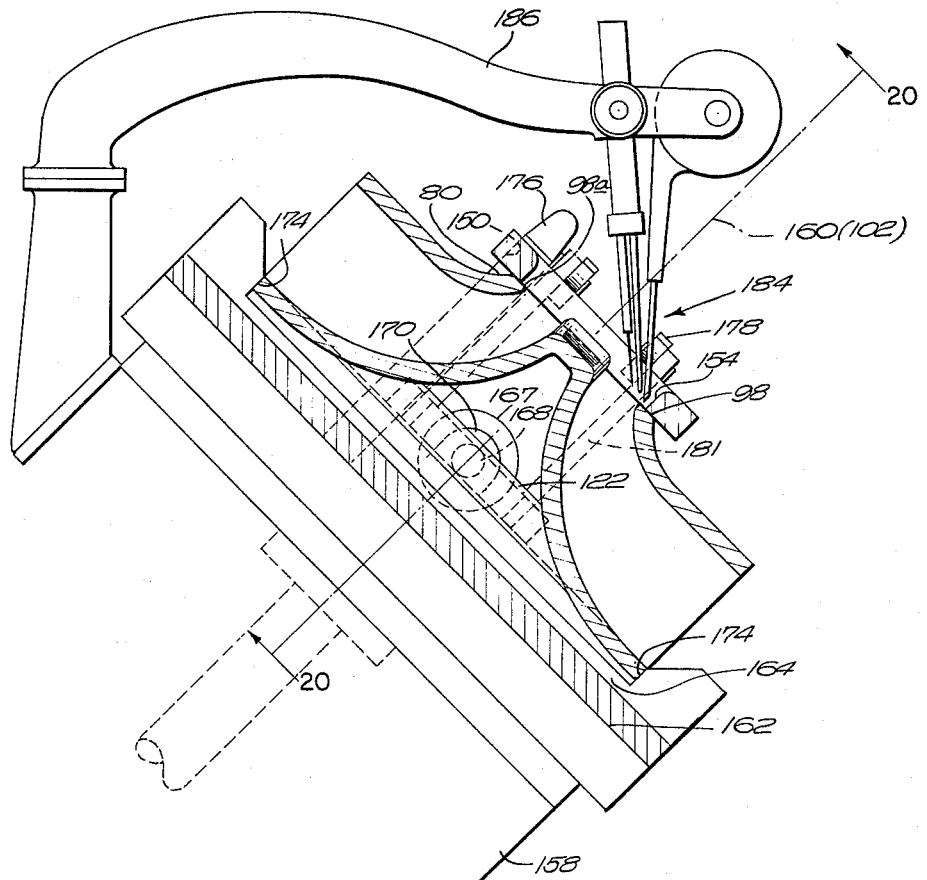
FIGURE 19 is a partially cross-sectioned side elevation view showing the pipe section of FIG. 5 and the plate section of FIG. 18 held together in a fixture mounted on an automatic welding machine and being automatically welded together.

FIGS. 19, 20 and 21 illustrate an automatic welding set-up for welding these side walls 154 to the pipe section flange surface 98. More particularly, FIG. 19 shows a work holding table 158 mounted on a fixed base (not shown) for rotation about a tilted axis 160. This rotation is accomplished by motor driven mechanism which is not shown but which is well known to those skilled in the art of welding.

The table surface 162 is provided with a fixture 164 for holding the pipe section and flange plate in their proper relative positions during the welding operation. This fixture includes a pair of opposed piston-cylinder clamping units 166 each of which has a hydraulic cylinder 167 driving a piston rod 168 guided in an intermediate bearing 170 and carrying on its end a clamping shoe 172 adapted to engage the pipe section web 122. When fluid pressure is supplied to the cylinders 167 for clamping action the web 122 is firmly seized between the shoes 172 and in such position relative to the table that the axis 102 of the section opening 12 coincides with the table axis 160. Alignment of the pipe section at right angles to the piston rods 167 is accomplished by the V-cut 173 and abutments 174 on the table.

Pins 176 projecting from the table 158 pass through the flange plate bolt holes 150 and thereby align the axis of the plate opening 152 with the table axis 160. Clamps 178 with tapered plate-engaging surfaces 180 pivoted on upstanding brackets 181 are secured to piston rods 168 so that when these rods are moved to clamp the reinforcing web 122 springs 182 urge the clamp surfaces 180 against the flange plate 146 and in turn press it against the pipe section flange surface 98. The result is that the pipe section and plate are held together with a portion 98a of the flange surface 98 extending inwardly with respect to the side walls 154 of the plate opening 152.

The axis 160 of the table is tilted as shown so that the welding equipment 184 extending downward from the overhead fixed head 186 is presented generally vertically and centrally into the V-groove formed on one side by the flange portion 98a and on the other side by opening walls 154. As the table rotates about axis 160 the welding equipment 184 is presented to successive parts of this V-groove until the complete opening has been traversed. The welding equipment 184 includes such items as welding rod, flux conduits, etc., usually found in automatic welding devices of this character. It is not intended that FIGS. 19, 20 and 21 be a precise representation of this kind of equipment, because those skilled in this art will understand what commercially available materials are required.

Because it is necessary that the upturned ends of the weir blend smoothly with the surface of the plate 144 it may be necessary to deposit more weld metal in the V-groove at these locations than elsewhere around the opening. This can be done later by making another weld in these locations (for example, a hand weld) or it can be done by slowing the rotation of the table 158 when the welding equipment 184 is presented to the groove at these weir ends.

Figure 22:
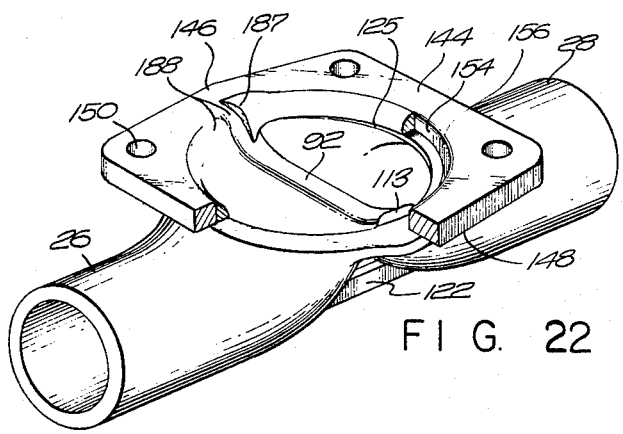
FIGURE 22 is a perspective view, partly sectioned, showing the weld applied by the automatic welding equipment and also showing in some areas how this weld has been machined to give the final form.

The weld usually requires some grinding and polishing to obtain the kind of surface required for the weir face and the diaphragm opening walls, and accordingly, it is preferred that there be a slight excess of weld material particularly in the region of the weir ends. This is illustrated in FIG. 22 which shows in one segment the excess weld metal 187 which can be removed by hand grinding or machining to obtain the shape shown at 188. FIG. 22 also shows in another segment how the plate and pipe section fit together prior to welding.

In the forming operation the ends of the pipe section are inevitably deformed to some extent, and accordingly, the pipe section is initially made a little longer than required for the final product. After forming the excess is merely cut off the ends to obtain the desired final length. These ends may be provided with flanges or threaded collars, or grooves as required for the particular type of connection to be used in the piping system. Such separate end configurations may be welded on or machined into the pipe section material.

Although very good results have been obtained when the pipe section is formed as shown and described thus far, namely by the application of die pressure on the external or exposed pipe section surfaces, it is also within the invention to employ other forming techniques to obtain the proper pipe section shape. For example hydroforming is particularly appropriate where the diaphragm valve is of the weir-less type, because in this type the movement of the pipe material is always outward when the diaphragm opening is being formed.

Figure 23:
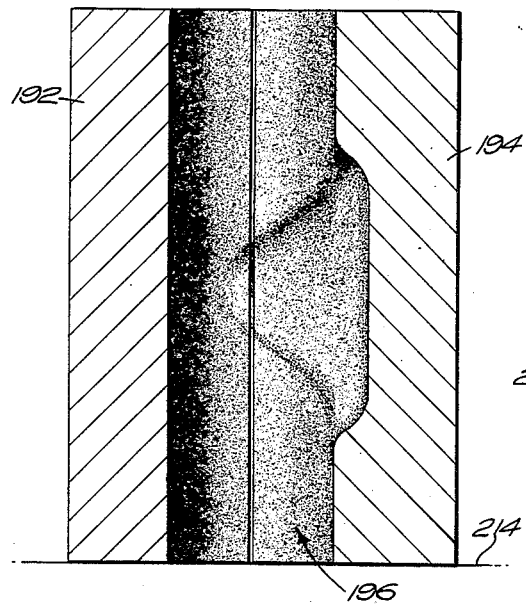
FIGURE 23 is a cross-sectioned side elevation view of die halves for forming weir-less valve bodies from sections of pipe.
Figure 25:
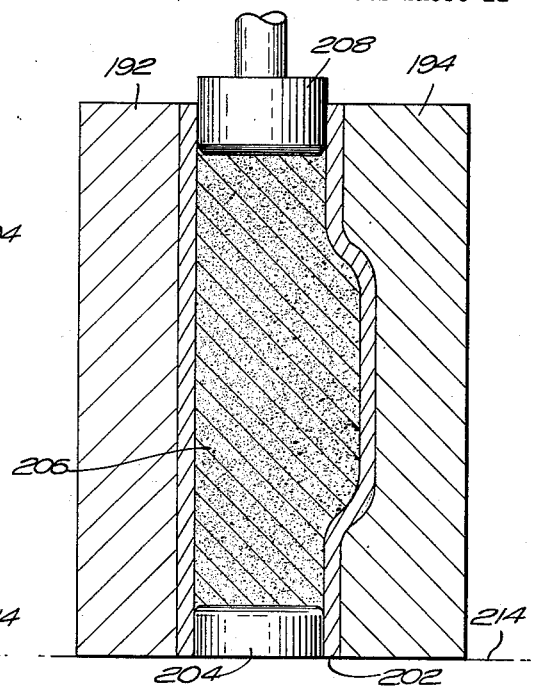
FIGURE 25 is a view like FIG. 24, but showing the press parts cooperating to create internal pressure in the Woods metal to force the walls of the pipe section against the surfaces of the die halves.
Figure 24:
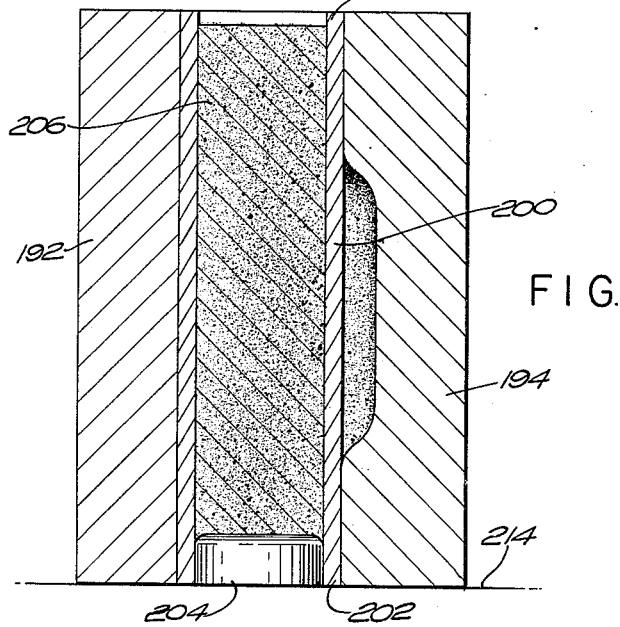
FIGURE 24 is a view like FIG. 23, but showing a section of pipe in the die, Woods metal in the pipe section, and press components arranged to cooperate with the ends of the section.

FIGS. 23 to 25 illustrate how a die 190 may be shaped and used to hydro-form the initial stage of a weir-less diaphragm valve body. The die is in two parts 192 and 194 and provide a cavity 196 having the shape of the external contours of the pipe section 198 shown in FIG. 26. The two die halves are joined and held together in any convenient fashion. Next a heated (approximately 1200° F.) straight pipe section 200 is inserted in the cavity 196 with the lower end 202 fitted over a centering block 204, and the interior of the pipe section is filled with some suitable incompressible material 206 such as Wood's metal.

Next a plunger 208, which fits nicely into the upper end 210 of the section 200, is forced down by a press head 212 to create a large pressure in the Wood's metal 206. The lower end of the die halves 192 and 194 and the centering block 204 all rest on the base 214 of the press. This pressure expands the pipe section walls until they fit the contours of the die cavity 196. The die halves are then separated, the formed pipe section is removed and the Wood's metal is disposed of in the usual and well known way.

This provides a pipe section 198 shaped as shown in FIG. 26. The cap portion 216 covering the diaphragm opening is then machined away to provide a pipe section 218 as shown in FIG. 27. The shape of the FIG. 26 section is such and the machining is done in such a way after machining a flat flange 219 is left which is circular at its inner edge 220, which is all in one plane and which has no overhang at points 222 where it joins the sides of the sloping walls 224.

FIG. 28 is like FIG. 22 and shows (around part A of the opening) how a plate 226 with a cylindrical opening 228 therethrough is initially welded to the flange 219. The plate opening 228 is larger than the inner flange edge 220 but slightly smaller than the outer flange edge 230. As a result the weld 232 is between the sides 234 of the plate opening 228 and the exposed inner annular portion 219a of the flange 219. This weld can be done automatically in the same manner shown in FIGS. 19, 20 and 21, and is in fact simpler because there is no weir and the weld can be uniform throughout. In addition, since there is no weir, the weld can be finally "dressed" (as shown around part B of the opening) with a rotary tool 236 like that shown in FIG. 30. This tool can be long enough to "dress" the entire seating surface from the upper surface 238 of the plate along the side walls 224 to the bottom of the passage.

I claim:

1. A method of forming a diaphragm valve body from a hollow cylindrical member and a flat plate member, said method comprising:
    (A) expanding a portion of said cylindrical member,
    (B) cutting away from said cylindrical member portion the parts thereof which extend beyond a flat plane located on one side of said cylindrical member to form:
        (1) an opening through said member portion,
        (2) a flange around said opening having inner and outer annular regions,
    (C) forming in said plate member an opening which:
        (1) corresponds to but is slightly larger than said cylindrical member opening,
        (2) has an annular surface region therearound and adjacent thereto,
    (D) covering only the outer annular region of said cylindrical member opening flange with said annular plate surface region,
    (E) securing said plate to the remaining uncovered inner annular region of said cylindrical member opening flange.

2. A method of forming a diaphragm valve body from a cylindrical member having an axis and from a separate flat plate member, said method comprising:
    (A) expanding a portion of said cylindrical member,
    (B) cutting in one side of said portion an opening having edges therearound,
    (C) turning away from said axis at least parts of said edges, (D) cutting away from said cylindrical member portion the parts of said opening edges which extend beyond a flat plane located on one side of said cylindrical member:
    (1) to enlarge said opening,
    (2) to form around said opening a flange having inner and outer annular surface regions,
(E) forming in said plate member an opening which:
    (1) corresponds to but is slightly larger than said enlarged cylindrical member opening,
    (2) has an annular surface region therearound and adjacent thereto,
(F) covering only the outer annular surface region of said cylindrical member opening flange with the said annular surface region of said plate,
(G) securing said plate to the uncovered inner annular surface region of said cylindrical member opening flange.

3. A method of forming a diaphragm valve body from a cylindrical member having a pair of ends and an axis and from a separate plate member, said method comprising:
(A) expanding a portion of said cylindrical member which is located between said ends,
(B) cutting in one side of said expanded portion an opening having edges therearound,
(C) turning said opening edges away from said axis,
(D) cutting away from said cylindrical member expanded portion the parts of said opening edges which extend beyond a flat plane located entirely on one side of cylindrical member ends:
    (1) to enlarge said opening,
    (2) to form around said enlarged opening a flange which:
        (a) has an inner edge defining the shape of said opening,
        (b) has an inner annular surface region adjacent inner edge,
        (c) has a outer edge, spaced from said inner edge,
        (d) has an outer annular surface region adjacent said outer edge,
(E) forming in said plate member an opening which:
    (1) has substantially the same shape as said enlarged cylindrical member opening,
    (2) is larger than said enlarged cylindrical member opening,
    (3) has on one side an annular surface region around said opening and adjacent thereto,
(F) locating said plate member and said cylindrical member with:
    (1) said openings in registration,
    (2) said plate member annular surface region overlying and engaging said outer annular surface region on the said opening flange of said cylinder member,
    (3) said plate member opening surrounding and exposing said inner annular surface region on the said opening flange of said cylindrical member,
(G) securing said plate to the said exposed inner annular surface region on the said opening flange of said cylindrical member.

4. A method of forming a diaphragm valve body from a cylindrical member having a pair of ends and an axis and from a separate flat plate member, said method comprising:
(A) expanding from said axis a portion of said cylindrical member which is located between said ends,
(B) cutting in one side of said expanded portion an opening having edges therearound,
(C) pressing toward said axis the side of said portion opposite said opening:
    (1) to form a weir,
    (2) to turn said edges away from said axis
(D) cutting said edges:
    (1) to enlarge said opening,
    (2) to form around said enlarged opening a flange which:
        (a) has an inner edge defining the shape of said opening,
        (b) has an inner annular surface region adjacent said inner edge,
        (c) has an outer edge spaced from said inner edge,
        (d) has an outer annular surface region adjacent said outer edge,
(E) forming in said plate member an opening which:
    (1) has substantially the same shape as said enlarged cylindrical member opening,
    (2) is larger than said enlarged cylindrical member opening,
    (3) is surrounded by an annular surface region on one side of said plate,
(F) locating said plate member and said cylindrical member with:
    (1) said openings in registration,
    (2) said plate member annular surface region overlying and engaging said outer annular surface region on the said opening flange of said cylindrical member,
    (3) said plate member opening surrounding and exposing said inner annular surface region on the said opening flange of said cylindrical member,
(G) securing said plate to the said exposed inner annular surface region on the said opening flange of said cylinder member.

5. A method of forming a diaphragm valve body from a cylindrical member having a pair of ends and an axis and from a separate flat plate member, said method comprising:
(A) expanding away from said axis a portion of said cylindrical member which is located between said ends,
(B) cutting in one side of said expanded portion an opening having edges therearound,
(C) pressing toward said axis the side of said portion opposite said opening:
    (1) to form a weir,
    (2) to move said edges beyond a flat plane on one side of said member,
(D) cutting said edges in said plane:
    (1) to enlarge said opening,
    (2) to form around said enlarged opening a flange which:
        (a) has an inner edge defining the shape of said opening,
        (b) has an inner annular surface region adjacent said inner edge,
        (c) has an outer edge spaced from said inner edge,
        (d) has an outer annular surface region adjacent said outer edge,
(E) forming in said plate member an opening which:
    (1) has substantially the same shape as said enlarged cylindrical member opening,
    (2) is larger than said enlarged cylindrical member opening,
    (3) is surrounded by an annular surface region on one side of said plate,
(F) locating said plate member and said cylindrical member with:
    (1) said openings in registration,
    (2) said plate member annular surface region overlying and engaging said outer annular surface region on the said opening flange of said cylindrical member, (3) said plate member opening surrounding and exposing said inner annular surface region on the said opening flange of said cylindrical member,
(G) securing said plate to the said exposed inner annular surface region on the said opening flange of said cylindrical member.

6. A method of forming a diaphragm valve body from a cylindrical member having a pair of ends and a longitudinal axis and from a separate flat plate member, said method comprising:
(A) expanding away from said axis a portion of said cylindrical member subtantially midway between said ends,
(B) cutting through said portion on one side of said cylindrical member an opening having edges therearound,
(C) pressing the opposite side of said cylindrical member toward said axis:
(1) to form a weir which:
(a) is elongated,
(b) extends across said opening,
(c) has a concave surface,
(2) to move at least substantial parts of said opening edges away from said axis and beyond a plane which:
(a) is flat,
(b) is on the said one side of said cylindrical member,
(D) cutting away from said cylindrical member the said edge parts which extend beyond said plane:
(1) to enlarge said opening,
(2) to form around said enlarged opening a flange which:
(a) is narrow,
(b) is flat,
(c) has an outer edge,
(d) has an outer annular surface region adjacent said outer edge,
(e) has an inner annular surface region located:
(i) adjacent said outer annular surface region,
(ii) inwardly with respect to said outer annular surface region,
(E) cutting away from the clindrical member portions of said flange which extend inwardly toward the center of said opening:
(1) to form an inner flange edge,
(2) said plate member annular surface region
(F) forming in said plate member an opening which:
(1) has parallel walls,
(2) has substantially the same shape as said enlarged cylindrical member opening,
(3) is larger than said enlarged cylindrical member opening,
(4) is surrounded by an annular surface region on one side of said plate member,
(G) locating said plate member against said cylindrical member with:
(1) said plate and cylindrical member openings concentric,
(2) said plate member annular surface region covering said cylindrical member outer annular surface region,
(3) said plate member opening exposing said inner annular region of said cylindrical member flange surface,
(H) welding the said parallel walls of said plate member opening to said inner annular region of said cylindrical member flange surface.

7. A method of forming a diaphragm valve body from a cylindrical member having a pair of ends and a longitudinal axis and from a separate flat plate member, said method comprising:
(A) expanding away from said axis a portion of said cylindrical member which is substantially midway between said ends,
(B) cutting through said portion of one side of said cylindrical member an opening which:
(1) has a center,
(2) edges therearound,
(C) pressing toward said opening a narrow section of said portion on the opposite side of said cylindrical member:
(1) until said section defines a weir which:
(a) extends arocss the opening,
(b) has ends adjacent the opening edges,
(2) until the said weir ends extend beyond a plane which:
(a) is flat,
(b) is on the said one side of said cylindrical member,
(3) until the edges of said opening extend beyond said plane,
(D) modifying said opening shape by cutting away from the cylindrical member:
(1) the portions of said weir ends which are are both:
(a) beyond said plane,
(b) and more than a first predetermined distance outward from said opening center,
(2) the portions of said opening edges which are both:
(a) beyond said plane,
(b) less than a second predetermined distance outward from said opening center,
to:
(3) enlarge said cylindrical member opening,
(4) form around said enlarged opening a flange which:
(a) is narrow,
(b) is flat,
(c) has an outer edge,
(d) has an outer annular surface region adjacent said outer edge,
(e) has a circular inner edge,
(f) has an inner annular surface region adjacent said inner edge,
(E) forming in said plate member an opening which:
(1) is circular,
(2) has a radius larger than said second predetermined distance,
(3) has cylindrical walls,
(4) is surrounded by an annular surface region on one side of said plate member,
(F) covering said outer annular surface region of said cylindrical member flange with said annular surface region of said plate member side,
(G) welding said cylindrical walls of said plate member opening to said inner annular surface region of said cylindrical member flange.

8. A method of forming a diaphragm valve body from a cylindrical member having a pair of ends and an axis and from a separate flat plate member, said method comprising:
(A) expanding away from said axis a short cylindrical bulge which:
(1) projects from one side thereof,
(2) is between said ends,
(3) has a closed end wall,
(B) cutting from said cylindrical member the parts of said bulge end wall extending beyond a plane which:
(1) is flat,
(2) is spaced from both said ends,
(3) is located on said one cylindrical member side,
to:
(4) form an opening in said cylindrical member, (5) form a flange surface which:
(a) is around said opening,
(b) has an inner edge with an inner annular surface region adjacent thereto,
(c) has an outer edge with an outer annular surface region adjacent thereto,
(C) forming in said plate member an opening which:
(1) corresponds to said cylindrical member opening,
(2) is larger than said cylindrical member opening,
(3) has on one side thereof an annular surface region surrounding said opening therein,
(D) covering only the outer annular surface region of said cylindrical member flange with said annular surface region of said plate member side,
(E) securing said plate member to the inner annular surface region of said cylindrical member flange.

References Cited by the Examiner

UNITED STATES PATENTS

| | | | |
|---|---|---|---|
| 1,937,312 | 11/1933 | Brotz. | |
| 2,616,164 | 11/1952 | Tiedmann | 29—157.1 |
| 2,669,011 | 2/1954 | Brumbaugh | 29—151.1 |
| 2,766,513 | 10/1956 | Huet | 29—157 |
| 2,869,221 | 1/1959 | Siepmann | 29—157.1 |
| 2,896,905 | 7/1959 | Stehlin | 251—366 |
| 2,903,236 | 9/1959 | Holycross et al. | 251—366 |
| 2,939,676 | 7/1960 | Kilcoin | 251—331 |
| 2,963,266 | 12/1960 | Boteler | 251—331 |
| 3,077,029 | 2/1963 | Kaye | 29—157.1 |

FOREIGN PATENTS

| | | |
|---|---|---|
| 489,602 | 7/1938 | Great Britain. |
| 963,325 | 5/1957 | Germany. |

WHITMORE A. WILTZ, *Primary Examiner.*

M. E. NELSON, J. D. HOBART, S. SCOTT, *Examiners.*